No. 696,686. Patented Apr. 1, 1902.
J. M. LYONS.
MOLD FOR MOLDING MAPLE SUGAR.
(Application filed Sept. 20, 1901.)
(No Model.)
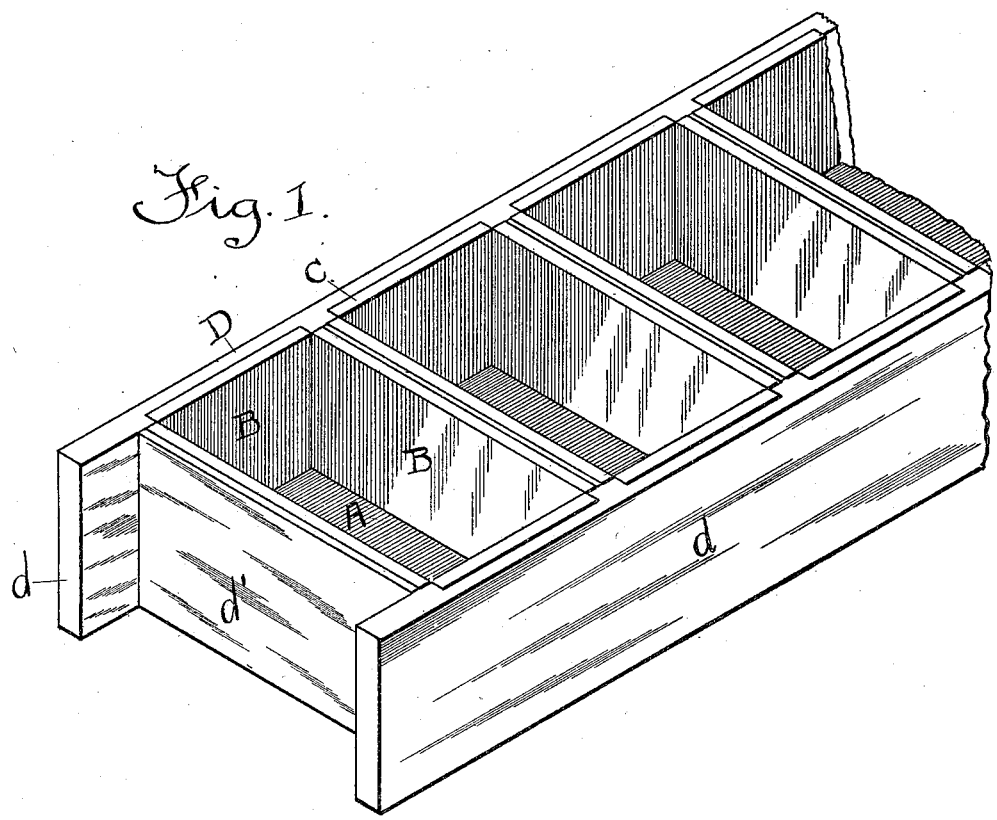
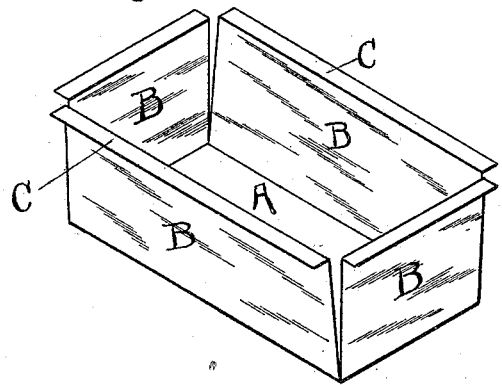
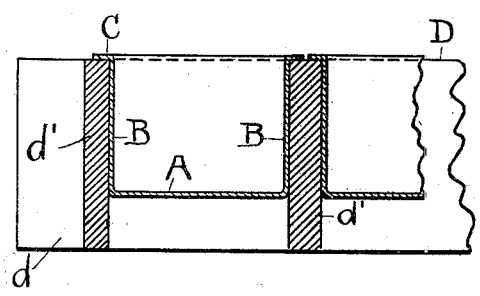
WITNESSES:
INVENTOR
Joseph M Lyons

UNITED STATES PATENT OFFICE.

JOSEPH M. LYONS, OF EVANSTON, ILLINOIS.

MOLD FOR MOLDING MAPLE-SUGAR.

SPECIFICATION forming part of Letters Patent No. 696,686, dated April 1, 1902.

Application filed September 20, 1901. Serial No. 75,866. (No model.)

*To all whom it may concern:*

Be it known that I, JOSEPH M. LYONS, a citizen of the United States, residing at Evanston, in the county of Cook and State of Illinois, have invented certain new and useful Improvements in Molds for Sugar and Similar Substances, of which the following is a specification.

The object of the invention is to provide a mold in which a cake of regular shape having smooth surfaces and well-defined corners may be made and from which the cake can be easily and quickly removed without marring it.

The invention consists in a mold having the features of novelty herein described, and in order that it may be fully understood I will describe it with reference to the accompanying drawings, which are made a part of this specification, and in which—

Figure 1 is a perspective view of a complete mold embodying said invention and a portion of a range of frames by which a number of molds proper may be supported. Fig. 2 is a vertical transverse section thereof. Fig. 3 is a perspective view of one of the molds proper removed from its supporting-frame.

The mold proper consists of a bottom A and four sides B, each of which preferably has at top a flange C, presented outward. The entire mold is preferably made of a single piece of elastic sheet material (metal being preferred) cut and bent to the desired shape; but the adjacent margins of adjacent sides are not secured together. They are, however, adapted to be brought together to form joints sufficiently tight to prevent the passage of the syrup; but by leaving them disconnected they are free to be moved relatively to each other, so that when the cake is made it may be easily and quickly removed by spreading apart the sides of the mold or preferably allowing them to spread by reason of the elasticity of the material of which the mold is made. To this end the sides have a normal divergence from bottom to top, and by reason of the elasticity aforesaid they will have a constant tendency to assume this divergence. In doing so after the cake is made they will cleave from its sides and leave it free to be removed without marring it.

For supporting the mold and holding the adjacent margins of its sides together during the process of molding the cake I prefer to use a simple frame D, the sides of which are relatively fixed and immovable and so related to each other that when the mold is inserted in the frame bottom first and forced down until the flanges C rest upon the frame the sides of the mold will be brought to the described relations to each other. The frame is open at bottom as well as at top in order to facilitate the removal of the mold, and in order to avoid injury to the bottom of the mold the frame is made somewhat deeper than the mold. Preferably a number of frames (say ten) are associated together in a single structure, so that a number of molds may be handled together, and in this case they are preferably disposed in a single range. They may be made of two parallel strips *d* and a number of transverse strips or partitions *d'*, suitably secured together.

What I claim as new, and desire to secure by Letters Patent, is—

1. A mold of the class described, comprising a mold proper having its walls divided from top to bottom whereby said walls may be spread apart for releasing molded article, and a frame having relatively fixed and immovable sides adapted to engage the walls of the mold for holding them together, the mold being entirely removable from the frame, substantially as described.

2. A mold of the class described, comprising a mold proper having its walls divided from top to bottom whereby said walls may be spread apart for releasing the molded article, and a frame having relatively fixed and immovable sides, the mold being entirely removable from the frame, and the interior dimensions of the frame being the same as the exterior dimensions of the mold, whereby when the mold is forced into the frame, the latter contracts the former, substantially as described.

3. A mold of the class described having a mold proper, comprising a bottom and sides all made of a single piece of elastic sheet material, said sides being free to move independently of each other, and adapted to have their adjacent margins brought together, and means for holding said sides with their margins together as aforesaid, substantially as set forth.

4. A mold of the class described having a mold proper, comprising a bottom and sides all made of a single piece of elastic sheet material, said sides being normally divergent, free to move independently of each other and adapted to have their adjacent margins brought together, and means for holding said sides with their margins together as aforesaid, substantially as set forth.

5. A mold of the class described having a mold proper, comprising a bottom and sides all made of a single piece of elastic sheet material, said sides being free to move independently of each other, and adapted to have their adjacent margins brought together, and a frame surrounding the mold and engaging its sides whereby their adjacent margins are held together, substantially as set forth.

6. A mold of the class described having a mold proper, comprising a bottom and sides all made of a single piece of elastic sheet material, said sides being normally divergent, free to move independently of each other and adapted to have their adjacent margins brought together, and a frame surrounding the mold and engaging its sides whereby their adjacent margins are held together, substantially as set forth.

JOSEPH M. LYONS.

Witnesses:
N. C. GRIDLEY,
W. J. CURTIS.